United States Patent [19]

Nagumo et al.

[11] 4,106,056
[45] Aug. 8, 1978

[54] SOLID STATE CCD CAMERAS HAVING PHASE ADJUSTMENT OF LUMINANCE AND CHROMINANCE COMPONENTS

[75] Inventors: Fumio Nagumo, Yokohama; Seisuke Yamanaka, Mitaka, both of Japan

[73] Assignee: Sony Corporation, Japan

[21] Appl. No.: 800,013

[22] Filed: May 24, 1977

[30] Foreign Application Priority Data

May 28, 1976 [JP] Japan .................................. 51-62081

[51] Int. Cl.$^2$ .......................... H04N 9/09; H04N 9/07
[52] U.S. Cl. .......................................... 358/50; 358/47
[58] Field of Search ........................ 358/41, 44, 47, 43

[56] References Cited

U.S. PATENT DOCUMENTS

| | | | |
|---|---|---|---|
| 3,975,760 | 3/1976 | Yamanaka et al. | 358/41 |
| 4,016,598 | 4/1977 | Yamanaka | 358/41 |

Primary Examiner—John C. Martin
Attorney, Agent, or Firm—Hill, Gross, Simpson, Van Santen, Steadman, Chiara & Simpson

[57] ABSTRACT

A solid state color camera of a type in which a composite color video signal of the NTSC system is obtained without using a specific color encoder. The solid state color camera has a solid state image sensing device having a plurality of image sensing cells or elements aligned in both vertical and horizontal directions for converting a light information of an object into an electric signal information in association with said image sensing elements, a color filter disposed in a light path of said light information of the object for modifying said electric signal information in accordance with color components included in said light information, a read-out register adapted to receive said electric signal information of one horizontal scanning period line by line from said solid state image sensing device and to supply an output video signal in a serial form, a separating circuit for separating a luminance signal component and chrominance signal component out of said output video signal from said read out register means, an adding circuit for adding said separated luminance signal components and chrominance signal components, a circuit for deriving at a system output a composite color video signal acceptable in the NTSC color system, a supplying circuit for supplying vertical and horizontal scanning signals to said solid state image sensing device, a circuit for supplying read out pulses to said read out register, a frequency of said read out pulses being selected to $(M/N) \times f_S$, where N and M are both integers and $f_S$ is a frequency of subcarrier of the NTSC color system, and an adjusting circuit for adjusting phase conditions of said luminance signal components at said system output so that they become equal to said alignment states of said image sensing elements of said solid state image sensing device.

10 Claims, 32 Drawing Figures

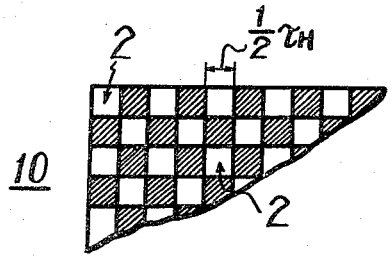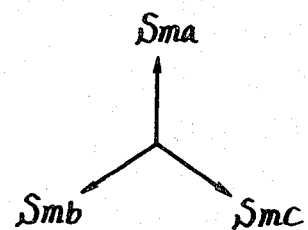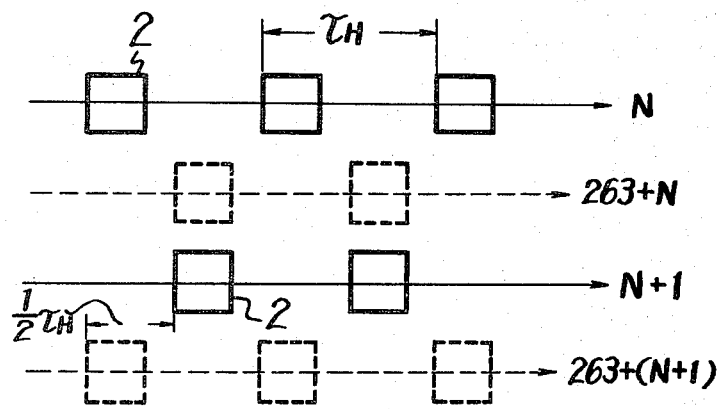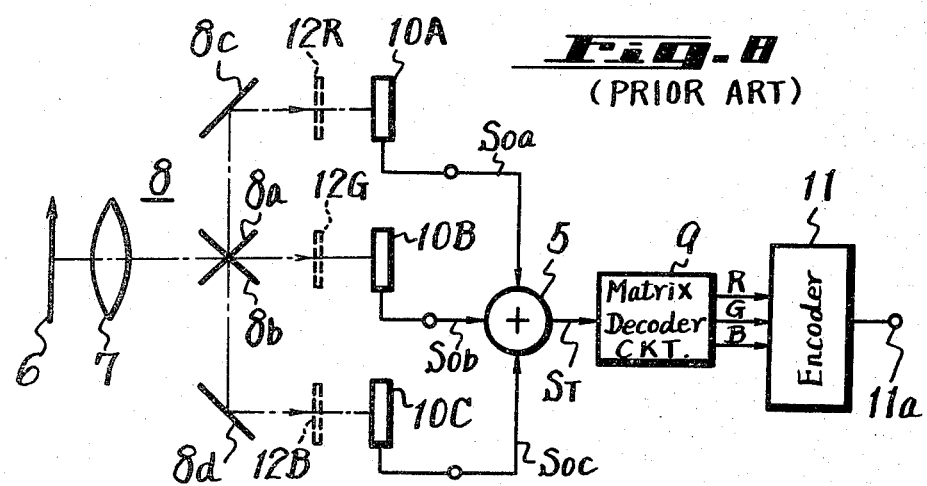

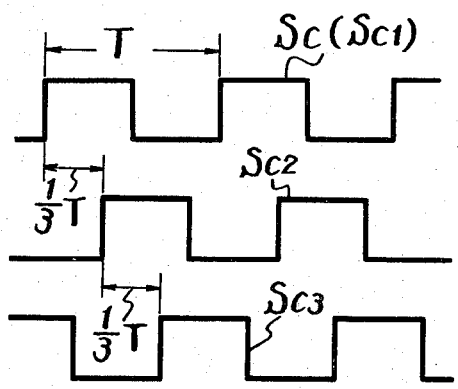
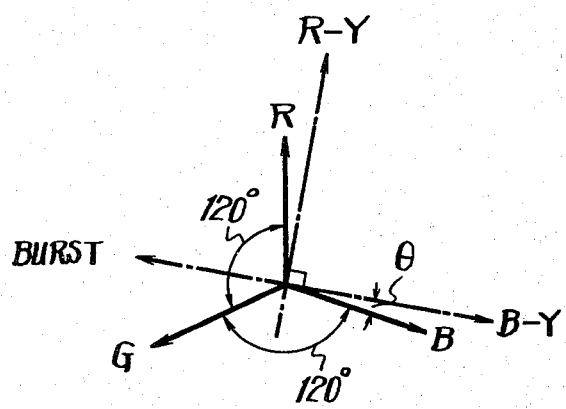

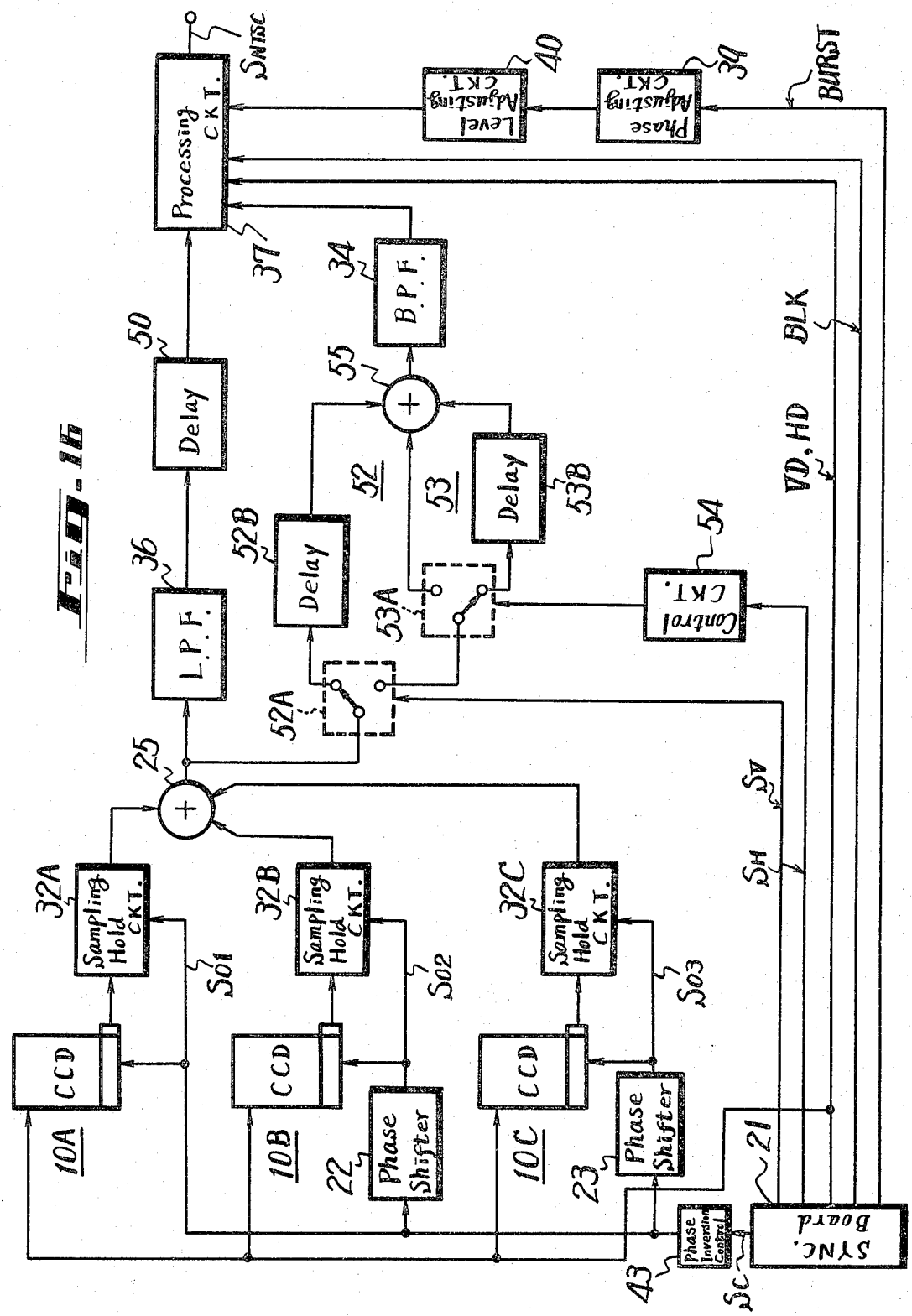

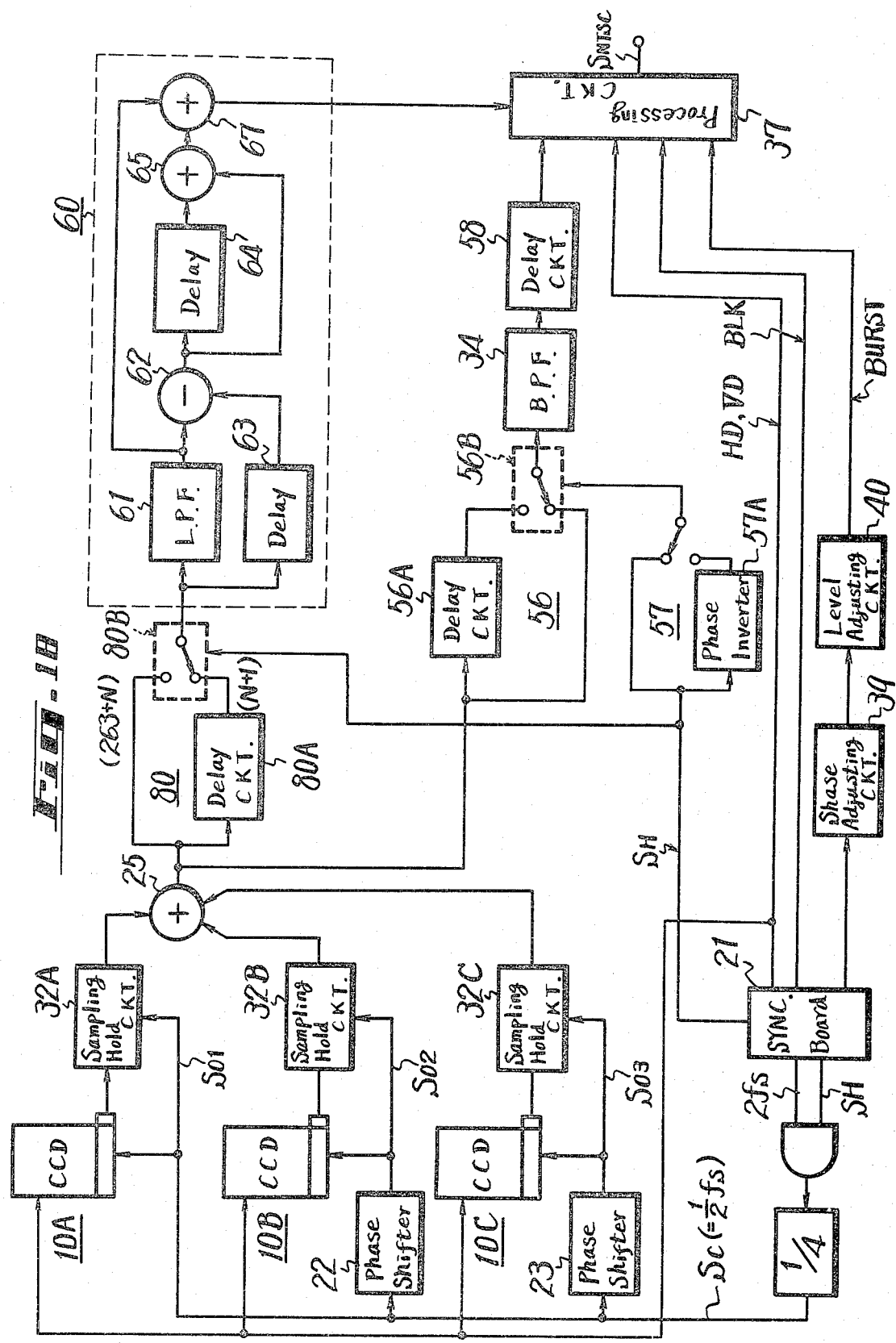

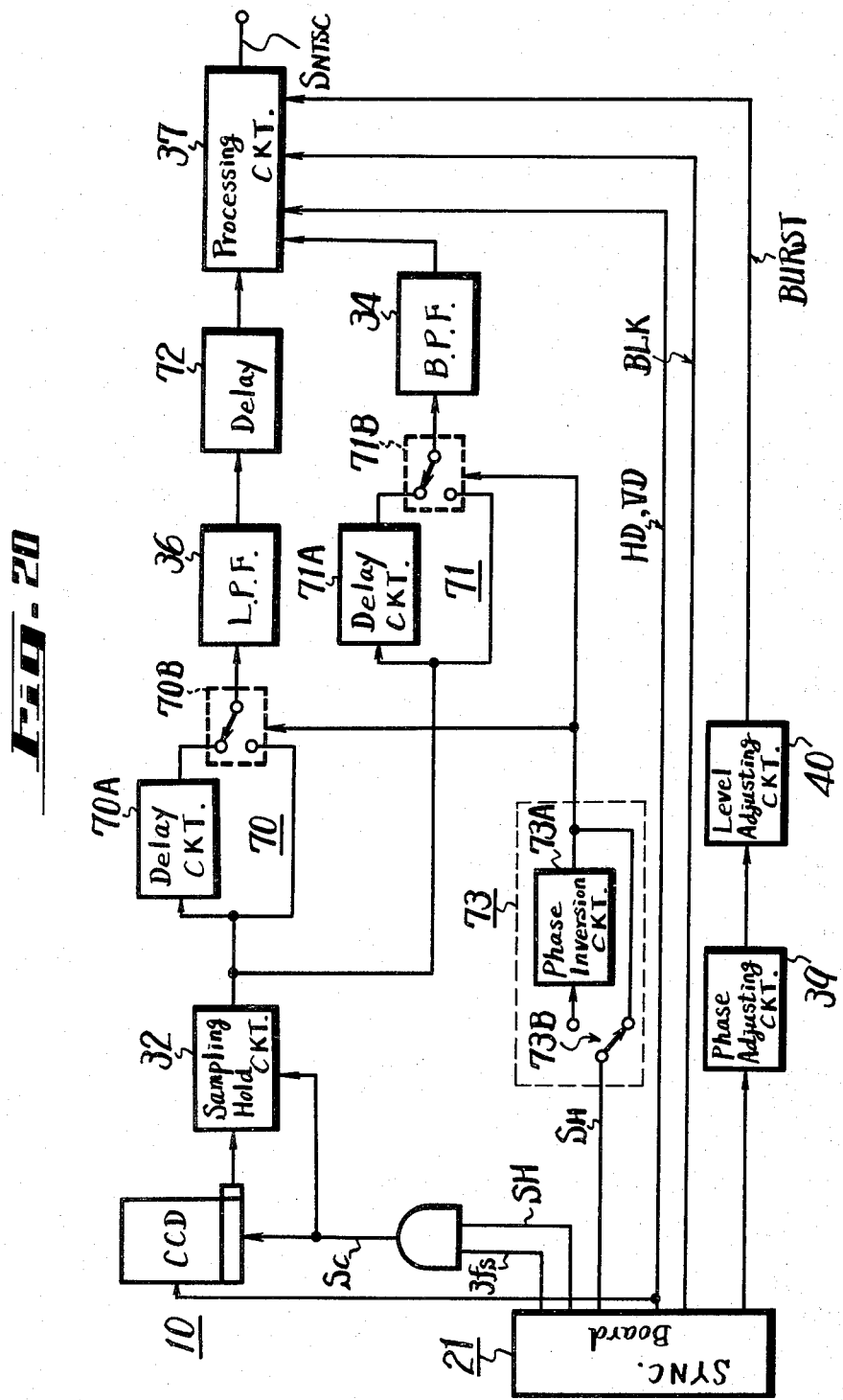

SOLID STATE CCD CAMERAS HAVING PHASE ADJUSTMENT OF LUMINANCE AND CHROMINANCE COMPONENTS

BACKGROUND OF THE INVENTION

1. Field of the Invention

This invention relates generally to a solid state color camera using a solid state image sensor such as a charge coupled device, and is directed more particularly to a solid state color camera using a solid state image sensor from which a color video signal satisfying a color video (picked up) signal of the quasi-NTSC system is obtained.

2. Description of the Prior Art

In the art, when a charge coupled device (which will be referred hereinafter to simply as CCD) is used as a solid state image sensor, the CCD is usually constructed as shown in FIG. 1. The solid state image sensor 10 shown in the figure is of the type of a frame (or field) transfer system. In FIG. 1, 1A designates an image sensing array on which an image of an object to be picked up is projected and which consists of a plurality of image sensing cells 2 (serving as picture elements) arranged in the row and column directions, 1B designates a temporary storage array which is substantially same as the image sensing array 1A in construction except that it is shielded optically and stores carriers corresponding to the light image of the object and transferred from the sensing array 1A at the positions corresponding to those of the array 1A, 1C designates a horizontal shift register which reads out the information carriers of one H (where H represents one horizontal scanning period) from the array 1B, and 3 designates an output terminal led out from the horizontal shift register 1C, respectively. Further, 4 indicates channel stoppers which are formed to be extended to the carrier transfer direction.

FIG. 2 is a schematic diagram which conceptionally illustrated the image sensing cells 2 of the image sensing array 1A in view of the center of image sensing cells. As shown in FIG. 2, plural image sensing cells 2 are arranged in the horizontal and vertical scanning directions parallel with one another. In FIG. 2, $\tau_H$ indicates the arranging pitch of the cells 2 in the horizontal direction. Further, the arrangement of the cells 2 in FIG. 2 is the case of an interlaced image taking system. The image sensing cells 2 shown by solid lines in FIG. 2 are used in odd fields, while the cells 2 shown by dotted lines in the figure are used in even fields.

The CCD 10 with the arrangement of cells 2 as shown in FIG. 2 is conventionally called as a parallel-aligned CCD. A CCD whose arrangement of image sensing cells is, for example, checker-board pattern can be also used as the solid state image sensor of this system.

FIG. 3 shows a part of one example of the checker-pattern CCDs, in which areas of each image sensing cell 2 are optically shield by ½ pitch ($\frac{1}{2}\tau_H$) as shown by the hatched portions in FIG. 3, and the optically shielded areas are arranged alternately to make the output signals of adjacent lines in opposite phase condition.

FIG. 4 shows a part of FIG. 3, which illustrates the image sensing cell portion in enlarged scale, conceptionally.

Before describing a solid state camera using the above CCD, a problem caused by using the above CCD as a solid state camera will be now described.

Since the input light informations corresponding to the image of an object are converted to electric signals under such a state that they are sampled at every image sensing cell, a picked up signal $S_O$ includes a side band component (AC component) $S_M$ in addition to a base band component or modulated component (DC component) $S_{DC}$ which will become a luminance signal, as shown in FIG. 5. In this case, a part of the side band component $S_M$ is overlapped on a high band portion of the modulated component $S_{DC}$ to cause an aliasing noise $S_{DH}$. Thus, the quality of a reproduced picture is deteriorated.

It is, however, possible to eliminate the aliasing noise by suitably selecting the band width of the modulated component $S_{DC}$ and the fundamental transfer frequency (sampling frequency) $f_C$ (= $1/\tau_H$), but this generally means that the band width of the modulated component $S_{DC}$ must be selected narrow. If the band width of modulated component $S_{DC}$ is selected, for example, about 3.5 MH$_z$ as in the ordinary case, the number N$_H$ of image sensing cells in the horizontal scanning direction must be increased because the transfer frequency $f_C$ is selected high as the band width of modulated component $S_{DC}$ is windened. Thus, the above methods are not practical.

Accordingly, a solid state camera free from the above problem will be now described. In such an example, as shown in FIG. 6, three CCDs 10A, 10B and 10C are used. In this case, three CCDs 10A, 10B and 10C are relatively displaced by $\frac{2}{3}\tau_H$ with one another in view of projected images. Thus, if the side band components derived from the CCDs 10A, 10B and 10C are taken as $S_{ma}$, $S_{mb}$ and $S_{mc}$, respectively, and the read-out timing or time relation upon reading out signals from the CCDs 10A, 10B and 10C is selected to satisfy the phase difference of 120°, the phase difference between the adjacent side band components $S_{ma}$, $S_{mb}$ and $S_{mc}$ becomes 120° as shown in FIG. 7. Thus, as shown in FIG. 8, if picked up output signals $S_{oa}$, $S_{ob}$ and $S_{oc}$ from the CCDs 10A, 10B and 10C which satisfy the above time relation are supplied to an adding circuit 5, the adding circuit 5 produces a picked-up signal $S_T$ in which the side band components $S_{ma}$, $S_{mb}$ and $S_{mc}$ are cancelled and hence there is no aliasing error. The solid state camera system shown in FIG. 8 is disclosed in the U.S. Pat. No. 3,975,760, so that its detailed description will be omitted. But, in FIG. 8, 6 denotes an object to be picked up, 7 an optical system, and 8 a spectroscopic system which includes, for example, half mirrors 8a, 8b and mirrors 8c, 8d. Further, 12R, 12G and 12B designate color optical filters located at the front of the CCDs 10A, 10B and 10C, 9 a matrix (decoder) circuit which is supplied with the picked-up signal $S_T$ from the adding circuit 5, and 11 an encoder which is supplied the output signal from the matrix circuit 9 and produces a color picked-up (video) signal satisfying the NTSC system to be delivered to an output terminal 11a.

If the camera is constructed as shown in FIG. 8, the aliasing noise can be eliminated and hence the deterioration of picture quality caused by the aliasing noise can be avoided.

By using plural CCDs, the number $N_H$ of image sensing cells of each CCD can be decreased.

In order to obtain a desired color picked-up signal of the NTSC system at the output terminal 11a of the camera shown in FIG. 8, it is conventional to supply the composite picked-up signal $S_T$ from the adding circuit 5 to the decoder 9 and to carry out the conversion processing of the signal.

In order to satisfy the picked-up signal $S_T$ itself as a color picked-up (video) signal $S_{NTSC}$ of the NTSC system (this system will be hereinafter called as a direct NTSC system), the following conditions (I) and (II) must be at least carried out.

(I)
$$S_{NTSC} = S_Y + S_C \quad (1)$$
$$S_Y = 0.30 E_R + 0.59 E_G + 0.11 E_B \quad (2)$$
$$S_C = \frac{R-Y}{1.14} \cos 2\pi \cdot f_S \cdot t + \frac{B-Y}{2.03} \sin 2\pi \cdot f_S \cdot t \quad (3)$$

(II)
$$f_S = \frac{455}{2} f_H \quad (4)$$
$$f_H = \frac{525}{2} f_V \quad (5)$$

where
$E_R$, $E_G$ and $E_B$: R(red), G(green) and B(blue) color signals
$f_S$: frequency of color sub-carrier
$f_H$: horizontal scanning frequency
$f_V$: vertical scanning frequency The condition (I) can be satisfied by suitably selecting, for example, the spectroscopic system and demodulating system, and the condition (II) can be satisfied by selecting, for example, the frequency of the transfer signal $S_C$, which will be fed to the horizontal shift register 1C of the CCD 10, equal to the frequency $f_S$ (= 3.579545 MH$_z$) of the color sub-carrier of NTSC standard.

That is, since the input light informations corresponding to the image of the object are converted to the electric signals under such a state that they are sampled at every image sensing cell, the chrominance component in the picked-up output signal $S_T$ from the CCDs 10A, 10B and 10C is obtained as a carrier chrominance signal. Further, if the transfer frequency $f_C$ is selected as the color sub-carrier frequency $f_S$, the carrier frequency of the carrier chrominance signal becomes the transfer frequency or color sub-carrier frequency to satisfy the above conditions (I) and (II). As a result, even if the encoder 11 is not used, the color video signal of the NTSC system can be obtained finally.

By the way, if the camera is constructed to satisfy the condition (II), the spatial arrangement of image sensing cells differs from the arrangement of image sensing points in the reproduced state, and in the arrangement of reproduced image sensing points the arrangement becomes different at every field and every frame. As a result, a flicker appears in a reproduced picture.

The above flicker phenomenon will be described in a case of the parallel-aligned CCD. FIG. 9A shows the spatial arrangement of image sensing cells 2 at the picking up portion of a CCD, and FIGS. 9B and 9C show the arrangements of reproduced image sensing cells, respectively.

The number $N_H$ of image sensing cells in the horizontal scanning direction in one horizontal scanning period $T_H$ is expressed as follows.

$$N_H = f_S \cdot T_H \quad (6)$$

Therefore, the displacement of the arrangement of the reproduced cells or points from the spacial arrangement of the cells on a CCD can be obtained by the equations (6) and (4).

That is, the cell arrangement at a certain field is sufficient to consider the arrangement of the final cell of previous line.

If an odd field at an odd frame is taken as a reference of first consideration, the number of final image sensing cells in N lines is given as follows.

$$N \cdot N_H = N \cdot f_S \cdot T_H \quad (7)$$

Since the following equation (8) is established $$f_H = 1/T_H \quad (8)$$

the equation (7) can be expressed as follows.

$$N \cdot N_H = (455/2) \cdot f_H \cdot T_H \cdot N$$

$$N \cdot N_H = (455/2) N \quad (9)$$

Thus, if the number N is an odd number or since the first line of this field is N = 1, the equation (9) can be rewritten as follows.

$$1 \times N_H = 455/2$$

$$1 \times N_H = l + \tfrac{1}{2} \quad (10)$$

where $l$ is an integer.

In general, if the reading out order which corresponds to a television scanning is taken into consideration, the final image sensing cell N·$N_H$ and the first cell (N·$N_H$ + 1) in the following (N + 1) line are arranged apart from each other by $\tau_H$ in view of space similar to the other cell arrangements. Therefore, the fraction $\tfrac{1}{2}$ in the equation (10) means that the first cell in the next (second) line is displaced from the reference time of the horizontal scanning period $T_H$ by $\tfrac{1}{2}\tau_H$. That is, the reproduced positions of the cells between the N and (N + 1) lines are relatively displaced by $\tfrac{1}{2}\tau_H$.

Accordingly, at the odd field in the odd frame, a movement or displacement of $\tfrac{1}{2}\tau_H$ of reproduced cells appears between the N line (odd line) and N + 1 line (even line) as shown in FIG. 9B by the solid line.

Next, an even field in an odd frame is now considered. In this case, since 264th line becomes the first line, the number of image sensing cells between the lines 263 and 264 can be calculated similar to the equation (9), as follows.

$$263 \cdot N_H = 263 \times (455/2) \cdot f_H \cdot T_H$$

$$263 \cdot N_H = \tfrac{1}{2} \times 263 \times 455$$

$$263 \cdot N_H = m + \tfrac{1}{2} \quad (11)$$

where $m$ is an integer. Thus, the reproduced image sensing cells move by $\tfrac{1}{2}\tau_H$.

Accordingly in the case of the even field, different from the odd field, the reproduced image sensing cells of only the odd line move, which is shown in FIG. 9B by dotted lines.

In the case of an even frame, the reproduced image sensing cells opposite to the those of the odd frame move on the respective fields, which is shown in FIG. 9C.

That is, in the even frame, the reproduced cells on the odd lines of the odd field move, while the reproduced cells on the even lines of the even field move.

As may be apparent from the comparison of FIGS. 9B and 9C, the movement of the reproduced cells occur between the odd and even frames and there is a period of every two frame.

When the arrangement of the reproduced cells is moved at every field and every frame as described above, there are caused flickers and jitters and hence a reproduced picture becomes discomfortable for a viewer.

When a checkered-pattern of a CCD is used as the CCD of the solid state camera, the similar phenomenon will be caused. In this case, however, the movement of the reproduced image sensing cells appears in only one field in either of the odd and even frames.

OBJECTS AND SUMMARY OF THE INVENTION

Accordingly, it is an object of the present invenion to provide a solid state color camera free from the defects of the prior art caused by the movement of reproduced image sensing cells in the direct NTSC system.

It is another object of the invention to provide a solid state color camera which is simple in construction but free from the defect inherent to the prior art.

It is a further object of the invention to provide a solid state color camera which produces a color video signal of the quasi-NTSC system without using an encoder and further without separating the luminance and chrominance components.

According to as aspect of the present invention there is provided a solid state color camera which comprises a solid state image sensing device having a plurality of image sensing cells or elements aligned in both vertical and horizontal directions for converting a light information of an object into an electric signal information in association with said image sensing elements, a color filter disposed in a light path of said light information of the object for modifying said electric signal information in accordance with color components included in said light information, a read-out register adapted to receive said electric signal information of one horizontal scanning period line by line from said solid state image sensing device and to supply an output video signal in a serial form, a circuit for separating a luminance signal component and chrominance signal component out of said output video signal from said read out register, an adding circuit for adding said separated luminance signal components and chrominance signal components, a deriving circuit for deriving at a system output a composite color video signal acceptable in the NTSC color system, a supplying circuit for supplying vertical and horizontal scanning signals to said solid state image sensing device, a circuit for supplying read out pulses to said read out register, a frequency of said read out pulses being selected to $M/N \times f_S$, where N and M are both integers and $f_S$ is a frequency of subcarrier of the NTSC color system, and an adjusting circuit for adjusting phase conditions of said luminance signal components at said system output so that they become equal to said alignment states of said image sensing elements of said solid state image sensing device.

The other objects, features and advantages of the present invention will become apparent from the following description taken in conjunction with the accompanying drawings through which the like references designate like elements.

BRIEF DESCRIPTION OF THE DRAWINGS

FIG. 3 is a schematic diagram showing a part of another example of a solid state image sensor;

FIG. 4 is a part of FIG. 3, in enlarged scale, showing an arranging pattern of image sensing cells of the sensor shown in FIG. 3;

FIG. 7 is a phasor diagram showing the phase relation of side band components;

FIG. 8 is a systematic diagram showing an example of a prior art solid state camera system;

FIGS. 12 and 13 are diagrams used for explaining the operation of the invention shown in FIG. 11;

FIGS. 14, 16, 18 and 20 are systematic block diagrams showing other examples of the invention, respectively;

DESCRIPTION OF THE PREFERRED EMBODIMENTS

The present invention will be hereinafter described.

In the invention, the frequency $f_C$ of transfer signal $S_C$ is selected to a multiple of that $f_S$ of color sub-carrier by $m/n$ ($m$ and $n$ are integers). The arranging pattern of reproduced image sensing cells by the transfer signal $S_C$ is selected or adjusted to be same as the spacial arranging pattern of image sensing cells of the solid state camera, and further a signal adjusting means is provided in the chrominance signal processing circuit such that the phase of color sub-carrier in the chrominance signal of the picked-up output becomes same as that of the color sub-carrier $f_S$ in the NTSC system.

Embodiments of the present invention can be classified in accordance with the number of CCDs used therein as follows:

I In case of three CCDs being used;
  I-A: CCDs of the parallel-aligned type are used and the transfer frequency $f_C$ is selected as $f_S$ ($\therefore m=n$), which is referred to first example.
  I-B: CCDs of the checkered-pattern type are used and $f_C = f_S$, which is referred to second example.
  I-C: Checkered-pattern CCDs are used and $f_C = \frac{1}{2}f_S$ ($\therefore n=2m$), which is referred to third example.

II In case of one CCD being used;
  II-A: A parallel-aligned CCD is used and $f_C = 3f_S$, ($\therefore 3n = m$), which is referred to fourth example.
  II-B: A checkered-pattern CCD is used and $f_C = 3f_S$, which is referred to fifth example.

II-C: A checkered-pattern CCD is used and $f_C = \frac{1}{2}f_S$, which is referred to sixth example.

A typical one among the above examples of the invention will be described.

In the invention, there are provided a means for correcting undesirable shifts or displacements of reproduced image sensing cells wherein the transfer frequency $f_C$ is selected to the color sub-carrier frequency $f_S$ of NTSC system and a means for adjusting the phase of color sub-carrier of chrominance signal same as that of the color sub-carrier of NTSC system, respectively.

Figure 1:
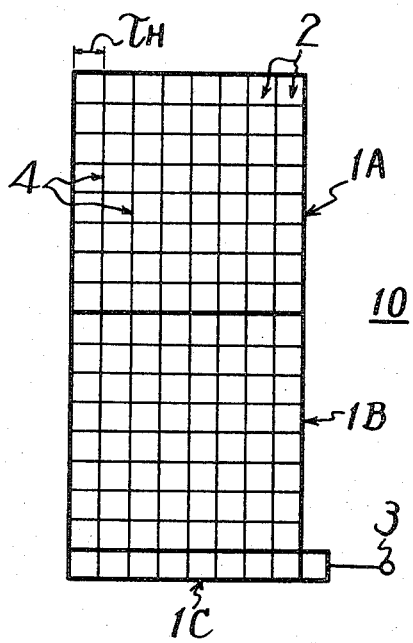
FIG. 1 is a schematic diagram showing one example of a solid state image sensor used for explaining the present invention.
Figure 6:
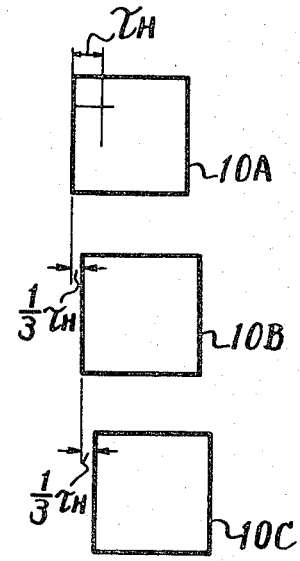
FIG. 6 is a schematic diagram showing a spatial arranging relation of plural solid state image sensors.
Figure 2:
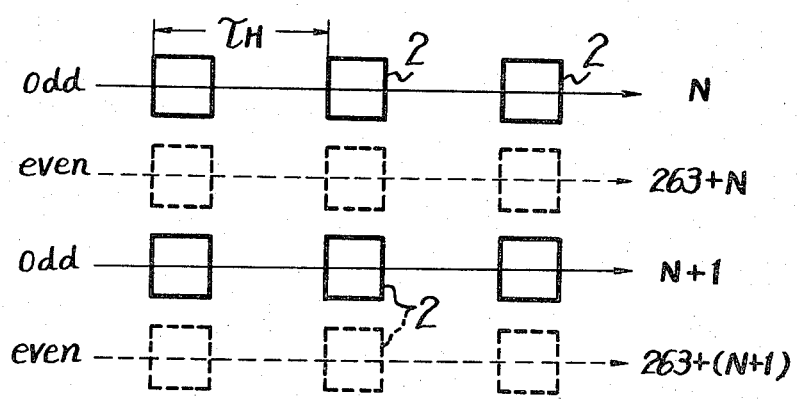
FIG. 2 is a part of FIG. 1, in enlarged scale, showing an arranging pattern of imaging sensing cells of the sensor shown in FIG. 1.
Figure 5:
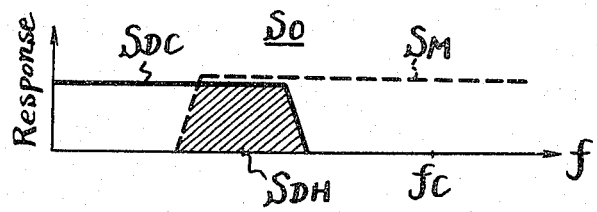
FIG. 5 is a frequency spectrum diagram of an output signal from the image sensor.
Figure 9:
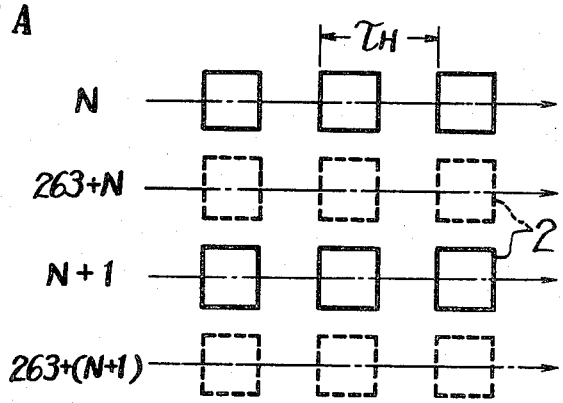
FIGS. 9A, 9B and 9C are diagrams used for explaining the operation of the cell shifting mechanism of the solid state camera shown in FIG. 8.
Figure 9:
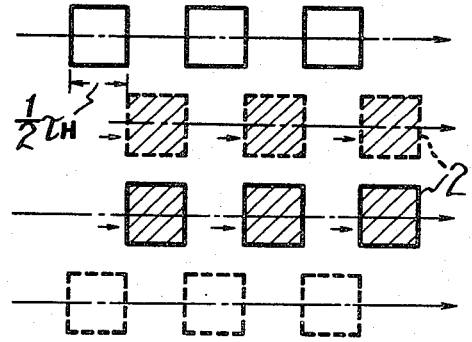
Figure 9:
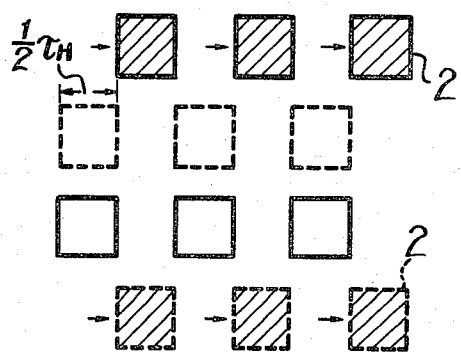

As described previously, in the relation between the spacial cell arranging pattern and reproduced cell arranging pattern, if the carriers corresponding to the image of an object are read out with the phase of transfer frequency $f_C$ (that is, the phase of color sub-carrier $f_S$) as a reference, the spacial cell arrangement pattern shown in FIG. 9A is reproduced by the patterns as shown in FIGS. 9B and 9C, in which the cells on only certain lines are displaced by $\frac{1}{2}\tau_H$, respectively. That is, in FIGS. 9B and 9C the reproduced cells with hatches are displaced by $\frac{1}{2}\tau_H$, respectively.

The patterns of reproduced cells shown in FIGS. 9B and 9C are those based upon the luminance signal and also those based upon the color signal. In other words, when the cells are read out with the phase of transfer frequency $f_C$ as reference, the phase between the adjacent horizontal scanning periods become opposite, so that the patterns of reproduced cells based upon the color signal are displaced as shown in the figures.

Figure 10A:
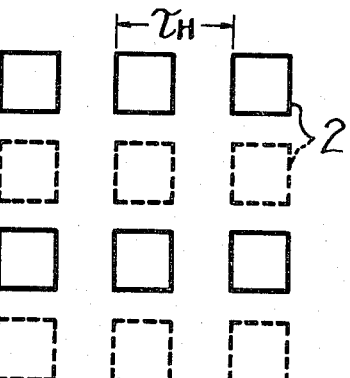
FIGS. 10A, 10B, 10C and 10D are diagrams used for explaining the operation of this invention.
Figure 10B:
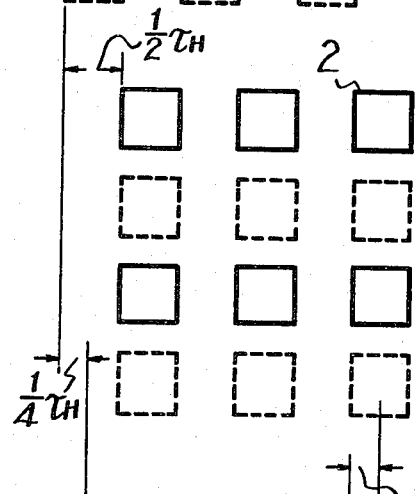

Firstly, the manner to correct the reproduced pattern of luminance signal will be described now. In an odd frame, if the signals on lines where no displacement of reproduced cells is caused (an odd line in an odd field and an even line in a even field) are delayed by a time corresponding to $\frac{1}{2}\tau_H$, as shown in FIG. 10B, the reproduced pattern of cells becomes same as the spacial arranging pattern of cells on a CCD (shown in FIG. 10A). In view of time, the former pattern is displaced from the latter by just $\frac{1}{2}\tau_H$.

In an even frame, if the signals on an even line of an odd field and those an odd line of an even field are delayed, respectively, contrary to the odd frame, the arranging pattern of reproduced cells just same as that shown in FIG. 10B can be obtained.

As described above, if the signal of certain lines are delayed by desired amount, the arranging pattern of reproduced cells of luminance signal can be made coincident with the spacial arranging pattern of cells.

The reproduced pattern of chrominance signal will be now described. The phase of carrier frequency $S_S$ (same as transfer frequency $f_C$) of chrominance signal in the picked-up output must be same as that of color sub-carrier frequency $f_S$ of NTSC system in case of direct NTSC system. While, the reproduced pattern of color signal has the phase relation to color sub-carrier of NTSC system, so that as to the color signal it is sufficient to correct its delay error relative to the luminance signal whose arrangement is made same as the spacial cell arrangement.

The cell arrangement pattern of luminance signal after it is corrected is as shown in FIG. 10B, while the reproduced pattern of color signal is as shown in FIG. 9B in odd frame but as shown in FIG. 9C in even frame. Since the cell displacement amount of color signal is $\frac{1}{2}\tau_H$, in order to make the displacement amount of reproduced cells color signal relative to the reproduced cells of luminance signal minimum, it is sufficient to delay the color signal by $\frac{1}{4}\tau_H$. As a result, the relative relation between the reproduced cells of color and luminance signals becomes as shown in FIGS. 10B, 10C and 10D, respectively.

Figure 10C:
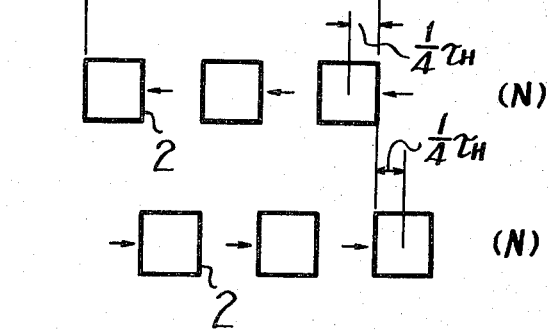
Figure 10D:
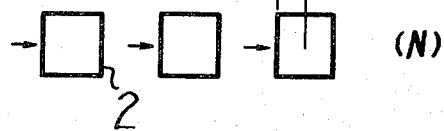

FIG. 10C shows the arranging pattern of reproduced cells in odd frame, and FIGS. 10D shows that in even frame, respectively with regard to the chrominance signal, in which only the cases of N line are shown. Under such a relation, the time difference between the luminance and chrominance is only $\frac{1}{4}\tau_H$.

If the arranging patterns of reproduced cells in the luminance and color signals are desirably corrected respectively as described above, all the defects inherent to the prior art direct-NTSC system can be avoided.

The condition necessary for achieving the direct-NTSC system, i.e. the above condition (I) will be briefly described.

In the spectroscopic system, the following conditions (a) and (b) are satisfied.
(a) The level ratio among the signals R, G and B, which form the luminance signal in the NTSC system, satisfy the equation (2).
(b) The side band components are cancelled so as to eliminate aliasing error.

In order to meet the above conditions (a) and (b), it is necessary that the output levels of the respective CCDs 10A, 10B and 10C are equal, so that the spectroscopic characteristics of color filters 12R, 12G and 12B must be selected to satisfy the above conditions. If color filters 12R, 12G and 12B, each being a single color light transmission type as shown in FIG. 8, are used, neither of the above conditions can be satisfied. Thus, color filters having the following spectroscopic characteristics are preferably required.

At first, the relation between the outputs $S_{oa}$, $S_{ob}$ and $S_{oc}$ of the CCDs 10A, 10B and 10C and the signals R, G and B is expressed by the following equation (12).

$$\begin{bmatrix} S_{oa} \\ S_{ob} \\ S_{oc} \end{bmatrix} = \begin{bmatrix} r_1 g_1 b_1 \\ r_2 g_2 b_2 \\ r_3 g_3 b_3 \end{bmatrix} \times \begin{bmatrix} R \\ G \\ B \end{bmatrix} \quad (12)$$

Although the detailed description for the above equation (12) to satisfy the conditions (a) and (b) will be omitted, if the respective constants are selected in accordance with the following equation (13), the conditions (a) and (b) are satisfied.

$$\begin{bmatrix} r_1 g_1 b_1 \\ r_2 g_2 b_2 \\ r_3 g_3 b_3 \end{bmatrix} = \begin{bmatrix} 0.2028 & 0.1305 & 0.0000 \\ 0.0423 & 0.2911 & 0.0000 \\ 0.0549 & 0.1684 & 0.1100 \end{bmatrix} \quad (13)$$

From the equation (13), the respective output levels $E_R$, $E_G$ and $E_B$ of the signals R, G and B become as follows.

$$\left. \begin{array}{l} E_R = (r_1 + r_2 + r_3) R = 0.3000 \\ E_G = (g_1 + g_2 + g_3) G = 0.5900 \\ E_B = (b_1 + b_2 + b_3) B = 0.1100 \end{array} \right\} \quad (14)$$

Thereby, the condition (a) is satisfied. Further, since the respective outputs $S_{oa}$, $S_{ob}$ and $S_{oc}$ from the CCDs 10A, 10B and 10C are expressed by the following equation (15)

$$\left. \begin{array}{l} S_{oa} = r_1 R + g_1 G = 0.3333 \\ S_{ob} = r_2 R + g_2 G = 0.3334 \\ S_{oc} = r_3 R + g_3 G + b_3 B = 0.3333 \end{array} \right\} \quad (15)$$

where $R = G = B = 1$, the condition (b) is also satisfied. Accordingly, the color filters 12R, 12G and 12B, which have filter characteristics to satisfy the equation (13), are located at the front of the CCDs 10A, 10B and 10C, respectively.

An example of the solid state color camera according to the present invention, which satisfies the above conditions (I) and (II) will be explained with reference to FIG. 11.

Figure 11:
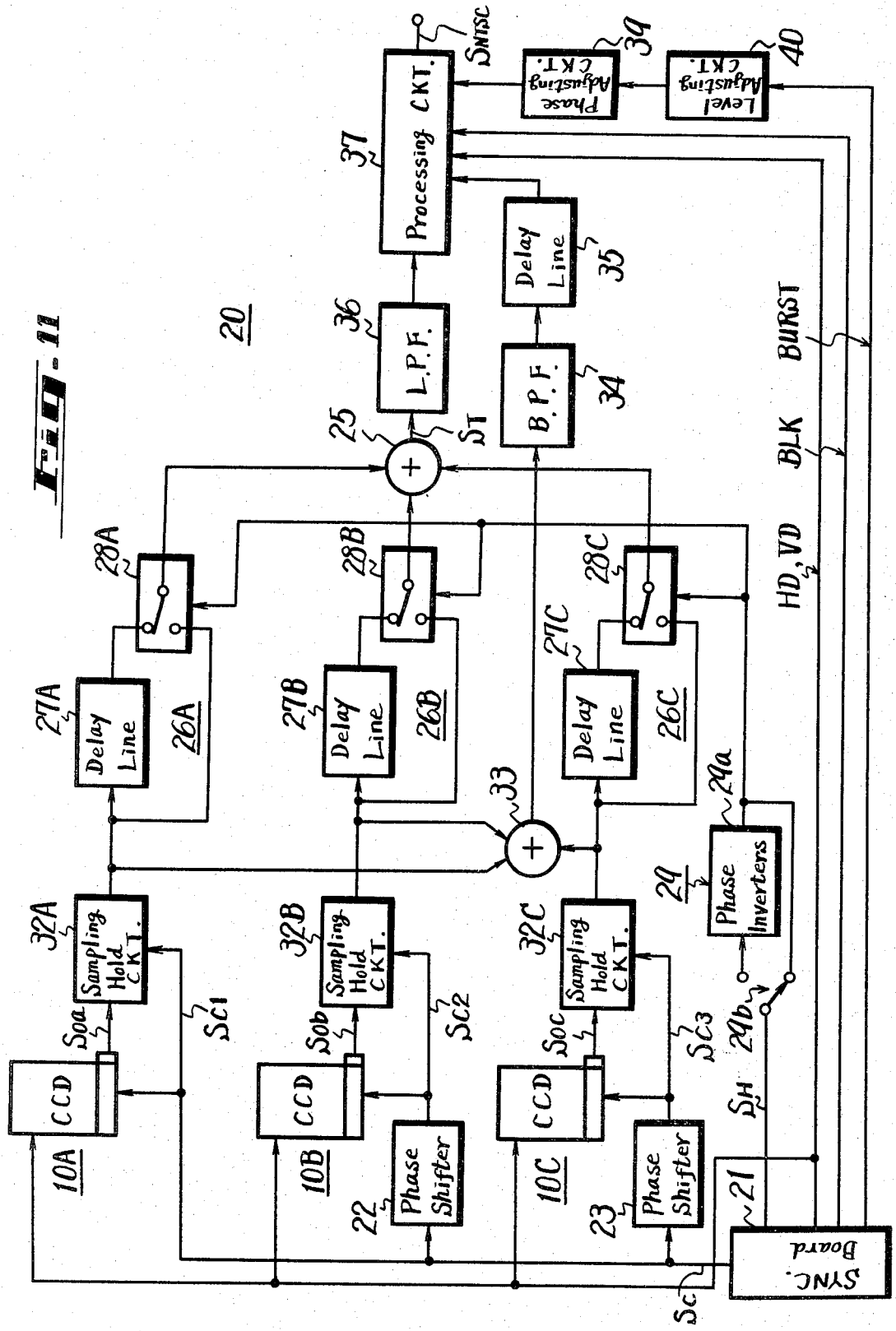
FIG. 11 is a systematic block diagram showing one example of the invention.

In FIG. 11 which is a systematic diagram of the example of the invention, 20 generally designates the solid state color camera wherein three CCDs 10A, 10B and 10C are supplied at their horizontal shift registers with the transfer signal $S_C$ obtained from a synchronizing board 21, respectively. In this case, it will be apparent that transfer signals $S_{C2}$ and $S_{C3}$ supplied to the CCDs 10B and 10C are shifted in phase from the transfer signal $S_C$ (or $S_{C1}$) supplied to the CCD 10A by $\frac{2}{3}\pi$ and $4/3 \pi$, respectively (Refer to FIGS. 12A, 12B and 12C). To this end, phase shifters 22 and 23 are provided to receive the transfer signal $S_C$ from the synchronizing board 21 and to produce the phase-shifted transfer signals $S_{C2}$ and $S_{C3}$, respectively.

As described above, with the invention read-out signals $S_{oa}$, $S_{ob}$ and $S_{oc}$ are obtained from the respective CCDs 10A, 10B and 10C alternately and successively in delayed state in view of time and then composed. In this case, however, in the respective signal transmission paths for luminance signal from the CCDs 10A, 10B and 10C to an adder 25, there are provided correcting circuits 26A, 26B and 26C which serve as adjusting means to adjust the displacement of reproduced image sensing cells of luminance signal.

Since all the correcting circuits 26A, 26B and 26C are same in construction, one of them, for example, the correcting circuit 26A will be now described. The correcting circuit 26A is formed of a delay circuit or delay line 27A and a switching circuit 28A which is supplied with the delayed output signal from the delay line 27A and non-delayed signal, respectively, and switched at every 1H. In this case, the delay time of delay line 27A is selected to be the time corresponding to the correcting amount $\frac{1}{2} \tau_H$ of the pitch shown in FIG. 10. When three CCDs 10A, 10B and 10C are used, $\frac{1}{2} \tau_H$ is about 140 n sec. (nano second)(micro second) so that this time is the delay time of delay line 27A. As set forth just above, the other correcting circuits 26B and 26C are formed of delay lines 27B, 27C, whose delay time is same as that of delay line 27A, and switching circuits 28B, 28C, respectively.

The switching circuits 28A, 28B and 28C are supplied with a switching pulse $S_H$, which is obtained from the synchronizing board 21 and synchronized with the horizontal pulse, so that from the switching circuits 28A, 28B and 28C there are derived the delayed and non-delayed output signals alternately at every 1H in a certain field. As described above, the delay line for delaying the picked-up outputs $S_{oa}$, $S_{ob}$ and $S_{oc}$ is the N line in the case of an odd field in an odd frame but the (N + 1) line in the case of an even field in the odd frame. While, in an even frame, the delay line is the (N + 1) line in an odd field and the N line in an even field. Therefore, in order to carry out the above mentioned switching operation, on the transmission path of the switching pulse signal $S_H$ there is provided a phase-inverting control circuit 29 which is formed of a phase inverter circuit 29a and a switch 29b which is switched at every field.

If the picked-up outputs $S_{oa}$, $S_{ob}$ and $S_{oc}$ which are obtained by the above switching operation, are composed, the luminance signal, whose reproduced cell pattern is shown in FIG. 10B, can be obtained.

In FIG. 11, 32A, 32B and 32C are sampling hold circuits connected between the CCDs 10A, 10B, 10C and the delay circuits 27A, 27B, 27C, respectively.

As to the chrominance signal, since whole signal is delayed by the time corresponding to $\frac{1}{4} \tau_H$, only a simple signal processing different from the luminance signal is necessary. That is, the picked-up outputs $S_{oa}$, $S_{ob}$ and $S_{oc}$ at the prior stage of the correcting circuits 26A, 26B and 26C are supplied to an adder 33 to be composed, and then fed to a band pass filter 34 which passes therethrough the chrominance signal $S_C$. The chrominance signal $S_C$ is fed to a delay circuit or line 35, which forms a correcting means whose delay time corresponds to $\frac{1}{4} \tau_H$ (70 μ sec. in this example). The arranging pattern of reproduced cells based upon the output from the delay line 35 becomes as shown in FIGS. 10C and 10D.

The output or composite output signal $S_T$ from the adder 25 is supplied to a low pass filter 36 to be restricted to a desired band (about 4.5 MHz) and then to a processing circuit 37, which is also supplied with the various synchronizing signals to produce the well-known composite color video signal $S_{NTSC}$. That is, the blanking pulse BLK, synchronizing signals VD, HD, burst signal BURST, which are obtained from the synchronizing board 21, and so on are supplied to the processing circuit 37. As shown in FIG. 11, vertical and horizontal synchronizing signals of the NTSC system are also supplied to respective CCDs 10A, 10B and 10C from the synchronizing board 21 in well-known manner.

In this case, the phase of the burst signal is selected as follows. When the chrominance signal is demodulated in a television receiver, its demodulating axes are R-Y axis and B-Y axis. In this case, the demodulated color signal with the above demodulating axes must be satisfy the condition of the NTSC system, namely, the equation (3). To this end, the axes R-Y and B-Y are selected as shown in FIG. 13. The angle $\theta$ shown in FIG. 13 can be determined, for example, as follows.

$$\theta = 12.4° \quad (16)$$

A demodulated output signal (chrominance signal) $S_a$ in the case of equation (16) is expressed by the following equation (17)

$$S_a = 0.245A \left\{ \frac{R-Y}{1.14} \cos 2\pi \cdot f_S \cdot t + \frac{R-Y}{2.03} \sin 2\pi \cdot f_S \cdot t \right\} \quad (17)$$

where A represents the output gain ratio between the side band component $S_M$ and the modulated component $S_D$. Thus, the demodulated output signal $S_a$ *differs from that of NTSC system in only the factor* 0.245A, but the factors or levels can be coincident with each other by utilizing the operation of an automatic color level control circuit in the television receiver.

If the phase of burst signal is selected as shown in FIG. 13 which satisfies the equation (16), color difference signals can be correctly demodulated. In FIG. 11, 39 designates a phase adjusting circuit and 40 designates a level adjusting circuit which are inserted into the transmission path of burst signal BURST for the above purpose.

If the optical characteristics are selected and the signal processing circuit are formed as described above, a camera of the direct-NTSC system can be formed and eliminate flickers in a reproduced picture.

The above description is given on a first example of the present invention, in which the reading out is carried out under the phase of $f_S$ being reference and the arranging pattern of reproduced cells beomes as shown in FIGS. 9B and 9C. It is, however, possible that the reading out can be achieved for the pattern of reproduced cell to become the spacial arranging pattern of cells. To this end, it is sufficient to use the transfer signal $S_C$ which is inversed in phase at every 1H.

Figure 14:
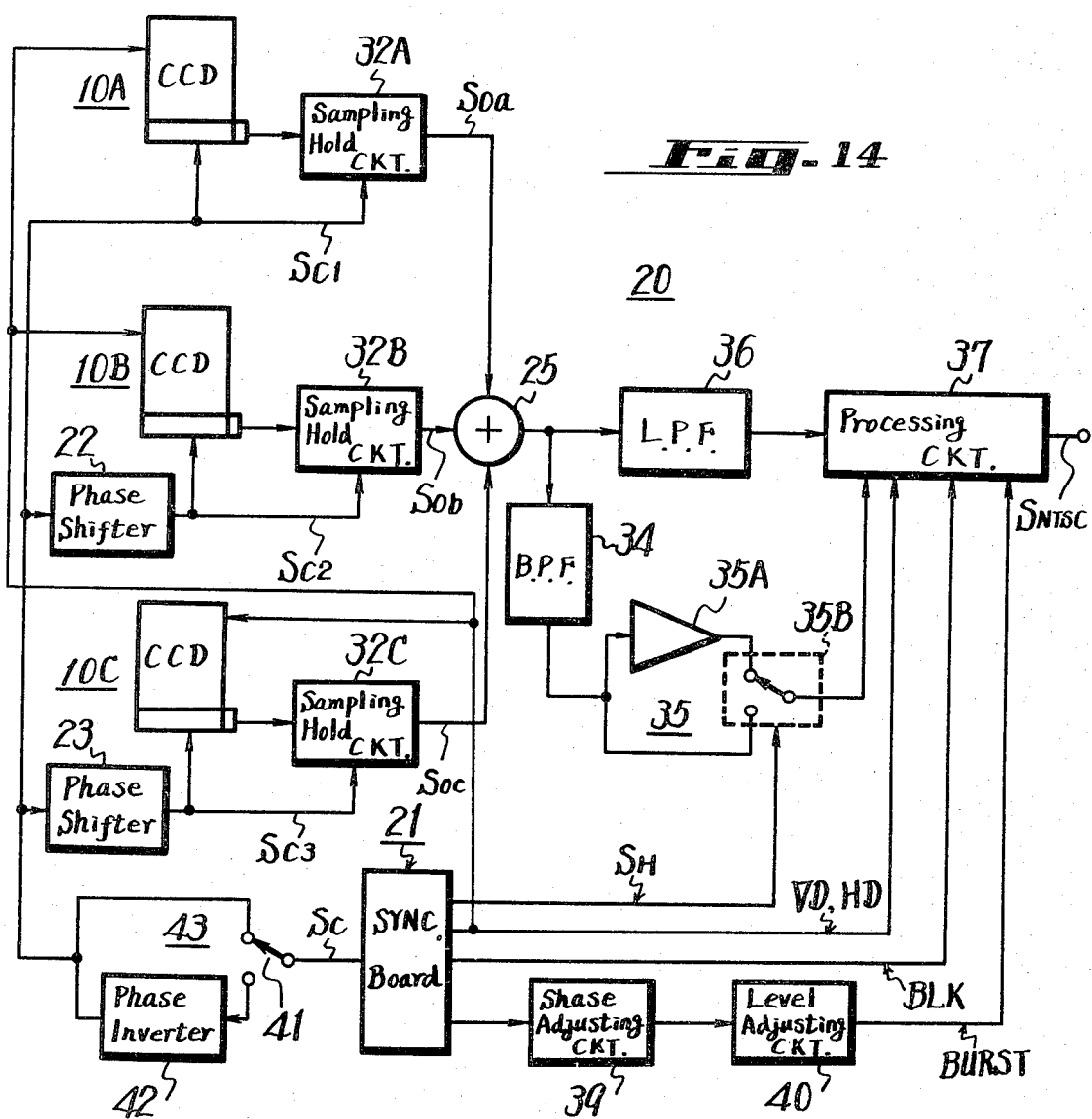

FIG. 14 is a block diagram showing the above example of the invention. In this example, the transfer signal $S_C$ from the synchronizing board 21 is fed to a control circuit 43 which is formed of a switch 41 which is switched at every 1H and a phase inverter circuit 42. Thus, the control circuit 43 produces a desired transfer signal $S_C$ (or $S_{C1}$, $S_{C2}$ and $S_{C3}$). In this case, the switch timing of switch 41 is selected so that the signal on the N line is phase-inverted. As a result, the pattern of reproduced cells becomes same as the spacial arranging pattern of cells and hence no correcting means for the luminance signal is required.

In this case, on the other hand, the phase of carrier frequency $S_S$ of chrominance signal is shifted, it becomes necessary to correct it. If the phase on only the line, on which the transfer signal $S_C$ is inversed, is inversed, it becomes the original phase of $f_S$. Therefore, a correcting means 35 provided on the signal transmission path for chrominance signal can be formed by an amplifier 35A for phase-inversion and a switch 35B which is switched at every 1H. The switched state in the figure is on one N line. In this case, it is of course possible to use a delay circuit whose delay time is selected as 140 n sec. (which corresponds to ½ $\tau_H$) in place of amplifier 35A.

As described above, in the invention the spectroscopic system is selected suitably and the frequency $f_C$ of transfer signal $S_C$ supplied to the CCDs is selected to the frequency of the color sub-carrier frequency $f_S$ of NTSC system, a color video signal of the NTSC system can be obtained directly from the CCDs. Therefore, the encoder 11 can be omitted and hence the circuit can be simplified. In other words, a solid state camera of direct-NTSC system can be formed.

Further, since in the invention the adjusting means is provided in the signal processing circuit for the picked-up signal so as to make that the arranging pattern of read-out signals forming the luminance signal becomes the spacial arranging pattern of cells and also that the phase of color sub-carrier in the carrier chrominance signal of picked-up signals becomes same as that of color sub-carrier in the NTSC system, the bad influence on a reproduced picture, when the direct-NTSC signal is employed, can be effectively eliminated. Thus, with the invention a good picture can be always reproduced.

Figure 15A:
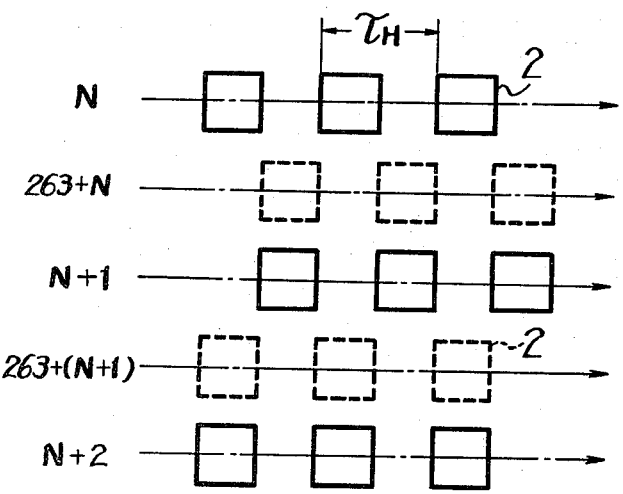
FIGS. 15, 17 and 19 are diagrams showing arranging patterns of spacial and reproduced cells and used for expalining the operations of the examples shown in FIGS. 14, 16, 18 and 20, respectively.
Figure 15B:
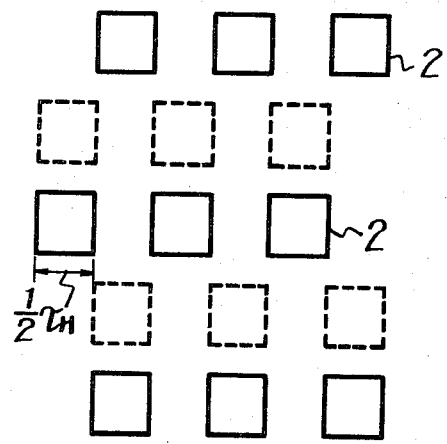

Other examples of the invention will be now described. When the CCD 10 of checkered-board pattern shown in FIG. 4 is used in a second example of the invention, although the detailed explanation will be omitted, the arranged pattern of reproduced cells on an odd frame becomes same as the spacial arranging pattern of cells on CCDs but is relatively displaced by ½ $\tau_H$ as shown in FIG. 15B in only an even frame.

Accordingly, as in the second example of the invention shown in FIG. 16 in block, if the phase inversion control circuit 43 is provided on the transmission path of transfer signal $S_C$ to inverse the phase of transfer signal $S_C$ only in the even frame, the arranging pattern of reproduced cells for the luminance signal can be made coincident with the spacial arranging pattern of cells on CCDs.

In this case, the phase of carrier frequency $S_S$ becomes different from that of $f_S$ due to the presence of phase inversion control circuit 43. Thus, the arranging pattern of reproduced cells for the chrominance signal, which should be as shown in FIG. 15A in an odd frame and as shown in FIG. 15B in an even frame, becomes as shown in FIG. 15A in either of the frames.

Figure 17A:
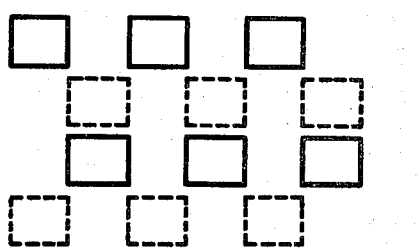
Figure 17B:
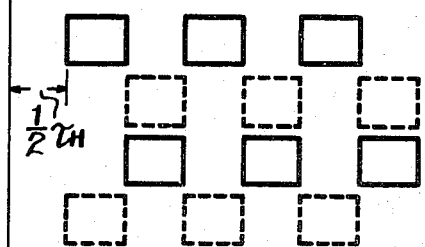

Therefore, in the example, the color signal is delayed, as a whole, by ½ $\tau_H$ in the odd frame to displace the arranging pattern of reproduced cells from the spacial arranging pattern of cells as shown in FIGS. 17A and 17B, and is subjected to delay process in the even frame described later. That is, if such a signal processing that an N line in odd field and (N + 1) line in even field are delayed by ½ $\tau_H$, respectively, is carried out, for the pattern shown in FIG. 17A, there is obtained the reproduced pattern shown in FIG. 17C, which is same as that shown in FIG. 15B.

Figure 17C:
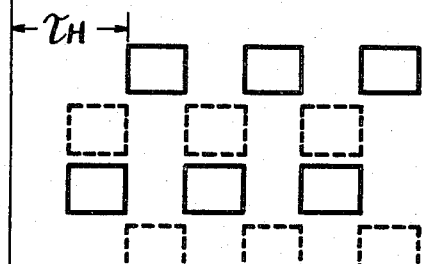
Figure 17D:
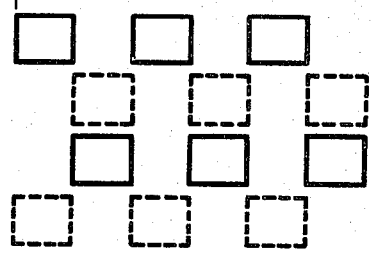

Therefore, it will be understood that the relation between the patterns shown in FIGS. 17B and 17C is similar to the relation in which the signal is read out by selecting the phase of transfer signal $S_C$ same as that of $f_S$ and hence the phase shift can be corrected. In this case, however, the luminance signal is displaced from the chrominance signal by ½ $\tau_H$, so that if the signal processing to shift the luminance signal by ½ $\tau_H$ as shown in FIG. 17D, the time difference between the luminance and chrominance signals can be made zero.

Turning back to FIG. 16, an example of the circuit, which achieves the above signal processing, will be now described. A delay circuit 50 is provided at the next stage of low pass filter 36 for delaying the luminance signal by the time corresponding to ½ $\tau_H$ (140 n sec.) which is determined in view of various factors such as transmission delays by the low pass filter 36, color signal processing and so on as described later.

On the color signal processing, there are provided first and second correcting circuits 52 and 53. The first correcting circuit 52 is used for the correction of odd frame so that it is formed of a first switch 52A, which is supplied with the output of adder 25 and the vertical synchronizing signal $S_V$ from the board 21, and a first delay circuit 52B connected to switch 52A. The first switch 52A is switched at every frame and rests on the position shown in FIG. 16 in odd frame. The delay time of first delay circuit 52B is selected to the value corresponding to ½ $\tau_H$ or 140 n sec. The second correcting circuit 53 is used for the correction of even frame and hence is formed of a second switch 53A, which is connected to switch 52A and is switched at every 1H and a second delay circuit 53B, which is connected to the switch 53A and whose delay time is selected to the value corresponding to $\tau_H$ or 280 n sec.

In FIG. 16, 54 designates a control circuit which is provided to receive the horizontal synchronizing signal $S_H$ from the board 21 and to supply its output to the second switch 53A for inversing the phase at every field, and 55 designates an adding circuit which is supplied with the outputs from first and second delay circuits 52B, 53B and second switch 53A.

Each of the examples of the invention described above is given on the case where the transfer signal $S_C$ itself is selected as the color sub-carrier signal. However, it is possible that the transfer frequency $f_C$ is selected as one-half of color sub-carrier frequency $f_S(\frac{1}{2}f_S)$ and the frequency $f_S$ itself is used as the carrier frequency of carrier chrominance signal. Such a case is the third example of the invention. In this case, the phase of color sub-carrier frequency $f_S$ is a reference for that of transfer frequency $f_C$. If the signal is read out under the above phase relation, though not illustrated, the special arranging pattern of cells is a checkered-pattern, but that of reproduced cells becomes same as the spacial arranging pattern of cells of parallel type CCD. Thus, in the third example it becomes necessary to correct both the luminance and chrominance signals.

FIG. 18 is a block diagram showing the third example of the invention, in which both $(n + 1)$ and $(263 + N)$ lines are delayed by $\tau_H$ for the luminance signal, although its detailed description will be omitted. In FIG. 18, 80 indicates a correcting circuit for that purpose which is formed of a delay circuit 80A whose delay time is selected as $\tau_H$ and a control switch 80B switched at every 1H.

Further, in FIG. 18 56 indicates a correcting circuit for the chrominance signal which is formed of a delay circuit 56A connected to the adder 25 and a control switch 56B connected to the delay circuit 56A and adder 25. In this case, since the line, on which the signal is delayed by $\frac{1}{2} \tau_H$ at every frame, is different, it is necessary to provide, on the transmission path of the switching pulse $S_H$ fed to the control switch 56B, a phase inverting control circuit 57 same in construction as that of above described on so as to phase-invert the pulse $S_H$. 57A indicates a phase inverter. Further, a delay circuit 58 of $\frac{1}{2} \tau_H$ is provided on the chrominance signal transmission path to correct the time error of the chrominance signal with respect to the luminance signal.

When the transfer frequency $f_C$ is selected as $\frac{1}{2}$ of color sub-carrier frequency $f_S$, side band components whose fundamental frequency is $\frac{1}{2} f_S$ are present and the side band components fall within the band of the luminance signal. Therefore, it is necessary to remove the side band components. To this end, the vertical correlation can be utilized. For example, an elimination or removing circuit 60 is provided as shown in FIG. 18. That is, the luminance signal is supplied to a low pass filter 61, from which low band components of 1 to 2 MHz are derived and the low band components are fed to a subtractor circuit 62 which is also supplied with the luminance signal which is not restricted in band. Thus, the subtractor 62 produces high band components. The reason why the low band components are removed is to avoid the resolution in the vertical direction. In this case, a delay circuit 63 is provided between switch 55B and subtractor 62 to compensate for the time delay caused by the existence of low pass filter 61.

The high band components from subtractor 62 is fed to a delay circuit 64 of 1H and thereafter to adder circuit 65 which is also supplied with the non-delayed high band components from subtractor 62 directly so as to carry out the vertical correlation process. That is, since the phases the side band components contained in the high band components are reverse between adjacent horizontal scanning lines, the side band components can be effectively removed by the provision of delay circuit 64. After the luminance signal is subjected to the vertical correlation processing, it is added with the above low band component at an adder 67 and supplied to the composite circuit 37 as the final luminance signal.

In the above examples, three CCDs are used to form solid state color cameras, but it is possible to form a solid state color camera of this kind by using only one CCD. One typical example of this case will be described.

Figure 19:
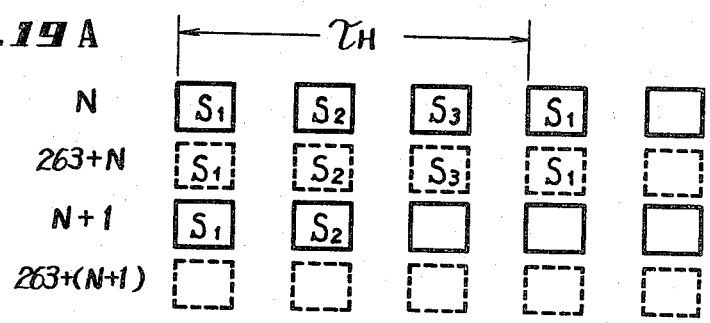
Figure 19:
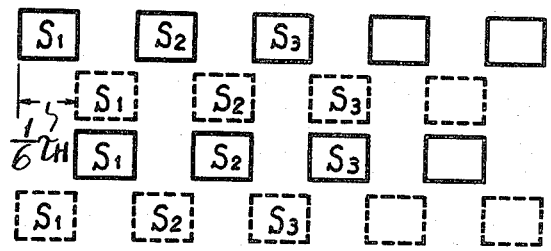
Figure 19:
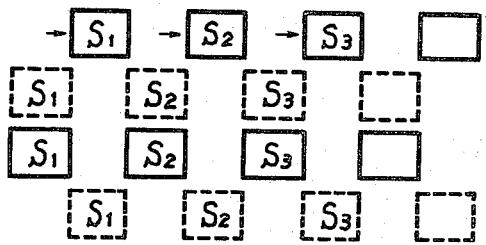

When one CCD is used, the transfer frequency $f_C$ is selected as $3f_S (f_C = 3f_S)$ and the pitch corresponding to three image sensing cells becomes a unit of the arranging pitch (refer to FIG. 19A). In this case, for example, if the signal is read out with the phase of, for example, $3f_S$ as a reference, the pattern of reproduced cells is displaced by $1/6 \tau_H$ as shown in FIGS. 19B and 19C. Accordingly, the luminance and chrominance signals have to be corrected, respectively.

Since the line on which cells move is different dependent upon frames, if cells on N and $\{263 + (N+1)\}$ lines in an odd frame and $(N + 1)$ and $(263 + N)$ lines in an even frame are moved by $1/6 \tau_H$, respectively, as to the luminance signal, the original cell arrangement can be obtained. Thus, it is sufficient that a correcting circuit 70 consisting of a delay circuit 70A with the delay time of $1/6 \tau_H$ and a control switch 70B inversed at every 1H as shown in FIG. 20.

On the other hand, a correcting circuit 71 is also provided for the chrominance signal. The correcting circuit 71 is formed of a delay circiut 71A with the delay time of $\frac{1}{3} \tau_H$, which is supplied with the output from the sampling hold circuit 32, and a control switch 71B which is supplied with the output delay circuit 71A and also the output of sampling hold circuit 32 and is switched at every 1H to delay lines different from the afore-said lines. Thus, the phases can be made coincident. In this case, however, there is caused a time delay between the luminance and chrominance signals, so that it becomes necessary to delay the luminance signal. To this end, a delay circuit 72 is provided between low pass filter 36 and processing circuit 37. In FIG. 20, 73 designates a phase inversion control circuit which consists of a switch 73B for receiving signal $S_H$ from synchronizing board 21 and a phase inversion circuit 73A supplied with signal $S_H$ through switch 73B. The output of circuit 73 is fed to control switches 70B and 71B, respectively.

The fifth and sixth examples previously mentioned could be easily understood from the above description on the first to fourth examples, so that an description thereon will be omitted.

It may be apparent that many modifications and variations could be effected by one skilled in the art without departing from the spirits or scope of the novel concepts of the invention, so that the scope of the invention should be determined by the appended claims.

We claim as our invention:

1. A solid state color camera of a type in which a composite color video signal of the NTSC System is obtained without using a specific color encoder, comprising:

(A) Solid state image sensing means having a plurality of image sensing cells aligned in both vertical and horizontal directions for converting a light information of an object into an electric signal information in association with said image sensing cells;

(B) Color filter means disposed in a light path of said light information of the object for modifying said electric signal information in accordance with color components included in said light information;

(C) Read out register means adapted to receive said electric signal information of one horizontal scanning period line by line from said solid state image sensing means and to supply an output video signal in a serial form;

(D) Means for separating a luminance signal component and chrominance signal component out of said output video signal from said read-out register means;

(E) Means for adding said separated luminance signal components and chrominance signal components;

(F) Means for deriving at a system output a composite color video signal acceptable in the NTSC color system;

(G) Means for supplying vertical and horizontal scanning signals to said solid state image sensing means;

(H) Means for supplying read-out pulses to said read-out register means, a frequency of said read out pulses being selected to $M/N \times f_S$, where N and M are both integers and $f_S$ is a frequency of subcarrier of the NTSC color system; and (I) Means for adjusting phase conditions of said luminance signal components at said system output so that they become equal to said alignment states of said image sensing cells of said solid state image sensing means.

2. A solid state color camera as claimed in claim 1, wherein said solid state image sensing means includes three chips of two dimensional solid state imaging devices, and each chip has a color filter relative to one of three primary colors, respectively.

3. A solid state color camera as claimed in claim 1, wherein said solid state image sensing means is a single chip of a two dimensional solid state imaging device, and color filter triads of three primary colors are aligned in said horizontal direction so that each of said image sensing elements corresponds to one of said three primary colors.

4. A solid state color camera as claimed in claim 3, wherein a value of said ratio M/N is selected to be three.

5. A solid state color camera as claimed in claim 4, wherein said phase adjusting means for said luminance signal is disposed in a luminance path for said separated luminance signal components to be supplied to said adding means.

6. A solid state color camera according to claim 5 further comprising means for adjusting phase conditions of said chrominance signal components at said system output to be a phase condition of a NTSC color subcarrier signal between successive line intervals, said chrominance phase adjusting means being disposed in a chrominance path for said separated chrominance signal components to be supplied to said adding means.

7. A solid state color camera as claimed in claim 2, wherein a value of said ratio M/N is selected to be 1, and said phase adjusting means is disposed in a luminance path for said separated luminance signal components to be supplied to said adding means.

8. A solid state color camera as claimed in claim 2, wherein said phase adjusting means is disposed in a read-out pulse path of said read-out pulse supplying means.

9. A solid state color camera according to claim 8 further comprising chrominance phase adjusting means disposed in a chrominance path for said separated chrominance signal components so as to yield a phase reversal at line by line so as to accord with a phase condition of a NTSC color sub-carrier signal.

10. A solid state color camera as claimed in claim 2, wherein a value of said ratio M/N is selected to be ½, and said phase adjusting means is disposed in a luminance path for said luminance signal components to be supplied to said adding means.

* * * * *